United States Patent [19]

Isotton

[11] 4,204,083

[45] May 20, 1980

[54] TERMINATION ON ELECTRIC POWER CABLES FOR NORMAL, HIGH AND VERY HIGH VOLTAGES

[75] Inventor: Adriano Isotton, Latina, Italy

[73] Assignee: Angelo Mariani, Italy

[21] Appl. No.: 851,188

[22] Filed: Nov. 14, 1977

[30] Foreign Application Priority Data

Nov. 18, 1976 [IT] Italy .................. 16907 A/76

[51] Int. Cl.² ........................................... H02G 15/02
[52] U.S. Cl. .............................. 174/9 F; 174/11 BH; 174/12 BH; 174/19; 174/73 R
[58] Field of Search ............. 174/9 F, 11 BH, 12 BH, 174/19, 73 SC, 73 R

[56] References Cited

U.S. PATENT DOCUMENTS

| | | | |
|---|---|---|---|
| 548,481 | 10/1895 | Uren | 174/9 F |
| 2,028,589 | 1/1936 | Clark | 174/11 BH |
| 2,187,116 | 1/1940 | Emblidge | 174/12 BH |
| 3,101,386 | 8/1963 | Cronin et al. | 174/11 BH |
| 3,730,970 | 5/1973 | Johnson | 174/73 R |

*Primary Examiner*—Bruce A. Reynolds
*Assistant Examiner*—E. Frederick Borchelt
*Attorney, Agent, or Firm*—Robert E. Burns; Emmanuel J. Lobato; Bruce L. Adams

[57] ABSTRACT

A termination applicable to electric power cables for normal, high and very high voltages comprises a housing for accommodating an end length of the cable shield, or a shield section including the shield end and a cable length extending beyond said shield end and comprising the conductor and associated insulation. Provision is made within the housing for a conductive fluid body having completely immersed therein the shield section including the shield end, and an insulating fluid body fully or partially filling up the remaining space within the housing, the latter being suited to receive and contain said fluids with a good sealing effect.

7 Claims, 3 Drawing Figures

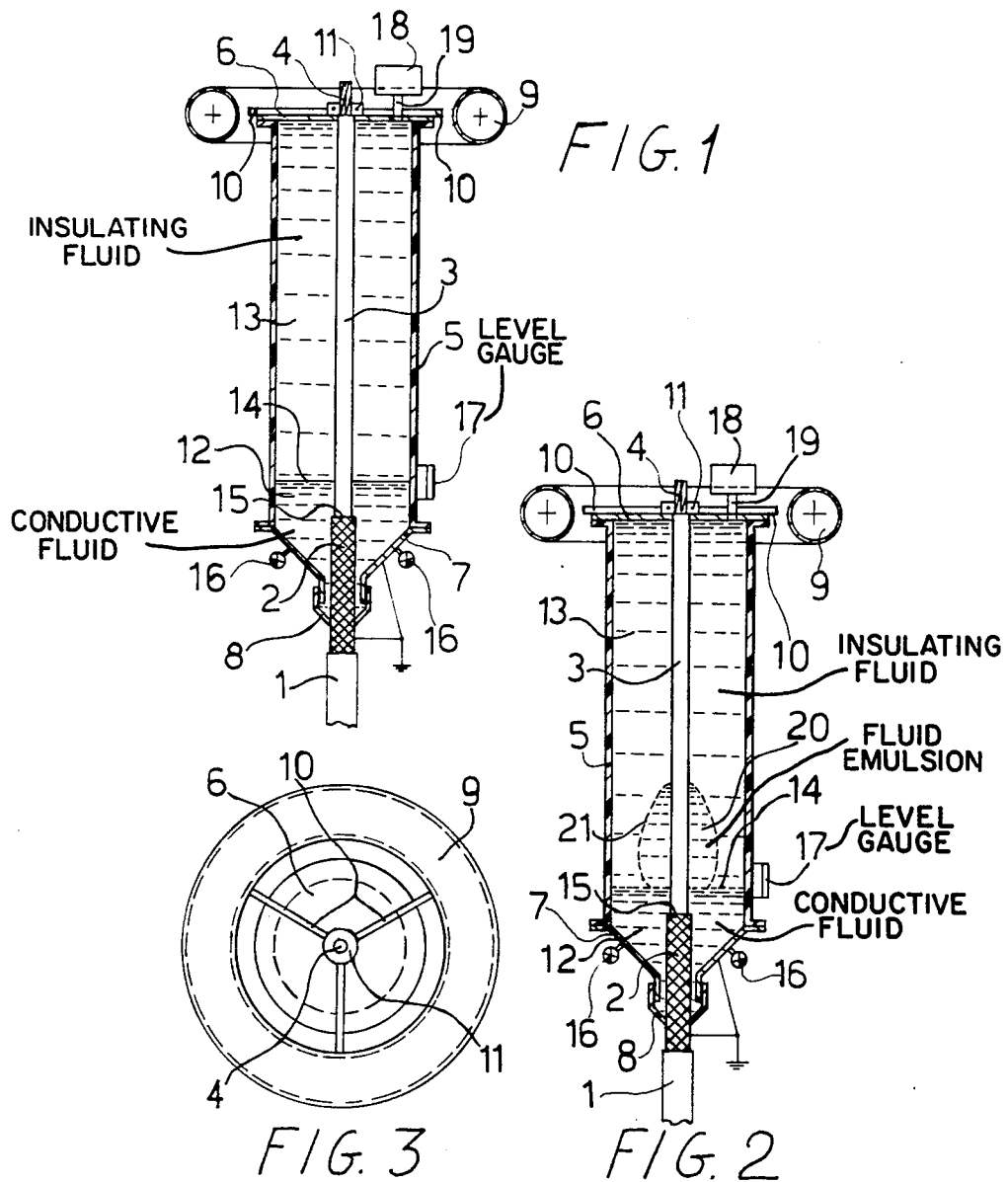

TERMINATION ON ELECTRIC POWER CABLES FOR NORMAL, HIGH AND VERY HIGH VOLTAGES

This invention relates to a termination on electric power cables for normal, high and very high voltages.

Devices are known by which the electric field is controlled at the cable terminations for transportation of electric energy at high voltage. For example, a system is known for controlling stresses by means of a deflecting cone. Another system is known for controlling stresses by insulating materials having a high dielectric constant, particularly higher than that of the cable insulation. Inter alia, such known systems are substantially expensive.

It is the primary object of the present invention to provide a termination on electric cables, particularly for high voltages, which is of a particularly simple construction, and accordingly relatively inexpensive, and reliable in operation.

It is a further object of the present invention to provide a termination of such construction that assembling thereof may be easily and readily carried out and without requiring any specifically skilled workmen.

A termination for electric cables according to the present invention is essentially characterized by comprising a housing for accomodating an end length of the cable, that is a shield section including the end of the shield and a cable length extending beyond said shield end and comprising the conductor or wire and associated insulating sheath, within said housing there being provided a conductive fluid mass or body having completely embedded therein said shield section including the shield end and an insulating fluid mass or body filling up the whole or part of the remaining space or volume within the housing, the latter being suitable to receive said fluids with a good sealing effect.

It has been found that under voltage and resulting electric field, a mixture of said two fluids will be formed within a space at the shield end. Now, such a mixture, which is also connected electrically to said shield, would aid in preventing a deleterious concentration of lines of force at the shield interruption or break location, that is at said shield end, causing the field lines of force to be distributed in a wider space, so as to avoid harmful stresses in the insulation. Upon voltage release, the two fluids tend to become separated again.

These and further features of a termination according to the present invention will be more clearly understood from the following description of an exemplary embodiment thereof, reference being had to the accompanying drawing, in which:

FIG. 1 is an axial sectional view showing the termination according to the invention at rest or inoperative condition, that is in absence of an electric field;

FIG. 2 is an axial sectional view of said termination, but shown under voltage; and FIG. 3 is a plan view of the device shown in FIGS. 1 and 2.

The termination shown in the accompanying drawing is related to an electric cable comprising an outer insulating sheath 1, a shield 2, for example an extruded semiconductor, which is grounded, an insulating sheath 3, and a conductor or wire 4.

A housing is provided and comprises a cylindrical tubular body 5 of suitable insulating, possibly transparent material, which is closed at the top by an insulating wall 6, such a housing comprising at the bottom a grounded metal base 7 and a union 8. Conductor or wire 4 projects outwardly above said closure wall 6.

The above described housing accomodates an end cable length comprising a shield section 2 and an insulation length 3, within which said conductor or wire 4 is located.

A guard ring is provided and includes a conductive annulus 9, the latter being fast with arms 10, also made of electrically conducting material and fast, in turn, with said tubular body or insulator 5.

These arms 10 are electrically connected to conductor or wire 5 by a connector or terminal 11. For example, there are three of such arms 10 arranged at 120° from one another.

Within the above described housing there is an electrically conducting liquid mass or body 12, above which an insulating or dielectric liquid mass or body 13 is provided, the housing accomodating said liquids with a good sealing effect, while reference numeral 14 designates the flat partition surface between said two liquid bodies 12 and 13. By mere way of unrestrictive example, said liquid conductive body 12 comprises undistilled water, whereas said dielectric liquid body 13 comprises oil, particularly high dielectric strength oil.

As clearly shown in the drawing, shield section 2, which is located within the above described housing and includes said end 15, or the shield interruption or break location, is completely embedded or immersed in said conductive liquid body 12; in other terms, said shield end 15 is below said partition surface 14 between said two liquid bodies 12 and 13.

Reference numeral 16 designates two taps for liquid inlet and outlet, respectively, while reference numeral 17 designates an apparatus forming a level gauge or indicator.

An element 18 is also provided, which element can be referred to as a compensator for possible changes in volume of said liquid bodies within the housing, this compensator 18 substantially comprising a cup or container connected through a small pipe 19 with the interior of the above described housing.

Under rest or inoperative conditions, that is substantially in the absence of electric voltages, the device or termination is that as shown in FIG. 1.

On the other hand, when conductor or wire 4 is at a quite high potential, so that there is a potential difference between said wire 4 and shield 2, the latter being grounded as well as metal base 7 and water body 12, the following would occur.

A heterogeneous system, or a mixture comprising water and oil is formed within the above described housing and namely within a space 20 (see FIG. 2) defined by dashed line 21. Substantially, a portion of said water body 12 rises and becomes mixed with insulating oil 13 right at a zone quite schematically and merely indicatively shown at 20, as defined by line 21 (see FIG. 2).

Of course, this space, wherein said water and oil mixture or emulsion is formed, actually does not have any exactly defined contour, as shown in FIG. 2. Obviously, said emulsion 20 is electrically connected with shield 2 and substantially is an extension thereof. Thus, an effective control of the electric field is provided at the interruption or break location of shield 2. In other terms, an effective control of the stresses is provided, or deleterious stresses of the insulation are avoided, which can be applied also for considerably high electric voltages.

According to the invention, a dynamic termination for self-control of the electric field is substantially provided. It is particularly significant that said emulsion 20 is of self-forming character from the condition (FIG. 1) at which conductive liquid 12 is separated by a flat surface 14 from insulating liquid 13. It should be noted that an outstanding property of the invention is that the liquids comprising the termination perfectly adhere to the insulation and semiconductor, thus aiding in passing severe tests at thermal cycles.

The above described device is particularly suited for test terminations and general testings, where the termination is required to provide superior electric holding warrantees over those of the cable. Remarkable advantages are obtained in use as testing and operating terminals, such as cables having an extruded insulation (rubber, for example ethylenepropylene rubber, PVC, polyethylene, reticulated polyethylene, etc.), or other type of insulation.

The above described termination is of a particularly simple structure and reliable in operation and relatively unexpensive. Equipments can be easily and readily made even by unskilled workmen or technicians. The termination according to the invention provides further advantages, such as absence of systems and fixtures (for example, degassing apparatus, deionizers, paper or elastomeric-thermoplastic material sleeves, etc.), high holding reliability even for voltages or over-voltages which would cause cable perforation.

Level indicator 17 is effective to control the level of conductive liquid 12, that is the level of surface 14, while compensator 18 is capable of receiving liquid from the above described housing when the volume of liquid increases due to an increase in temperature, but when the temperature drops, a portion of said liquid moves from compensator 18 back to said housing.

Of course, in addition to the above described exemplary embodiment, many variants or changes are possible still within the scope of the present invention, for example as to said conductive liquid 12 and insulating liquid 13, as well as further details of the above described device.

What I claim is:

1. A termination on a shielded electric cable for normal, high or very high voltage, comprising a housing for accommodating an end length of the cable, an electric cable comprising a conductor, insulation surrounding said conductor and a shield around said insulation, an end length of said cable being received in said housing with an end section of said shield in said housing and with said conductor and insulation in said housing extending beyond said shield, a terminal electrically connected to the end of said conductor, a body of conductive liquid in said housing immersing said end section of said shield and a body of insulating liquid at least partially filling the remaining space within said housing, and means for sealing said bodies of liquid in said housing.

2. A termination according to claim 1, wherein said conductive liquid body comprises water.

3. A termination according to claim 2, wherein said insulating liquid body comprises high dielectric strength oil.

4. A termination according to claim 3, wherein a level indicator is associated with said housing at the level of the interface between said water and said oil.

5. A termination according to claim 1, wherein said body of insulating liquid completely fills said remaining space within said housing and wherein means is associated with said housing for compensating for expansion of said liquid bodies.

6. A termination according to claim 1, wherein said housing comprises an insulating tubular body, a closure for the top of said tubular body, a grounded metal base at the bottom of said tubular body, and a union for sealing between said metal base and said shielded cable.

7. A termination according to claim 6, wherein said terminal comprises a connector on the end of said conductor of said cable, a plurality of spokes radiating from said connector and a conductive annulus joined with said spokes.

* * * * *